United States Patent [19]

Kubota et al.

[11] Patent Number: 5,250,601

[45] Date of Patent: Oct. 5, 1993

[54] HIGH-STRENGTH HEAT INSULATING MATERIAL AND METHOD OF PRODUCING SUCH MATERIAL

[75] Inventors: Kazuo Kubota; Masaaki Kayama; Yasumichi Mukaida, all of Kanagawa, Japan

[73] Assignee: Nichias Corporation, Tokyo, Japan

[21] Appl. No.: 939,462

[22] Filed: Sep. 2, 1992

[30] Foreign Application Priority Data

Sep. 5, 1991 [JP] Japan .................. 3-252730

[51] Int. Cl.$^5$ .................. C08K 3/34; C08K 11/00
[52] U.S. Cl. .................. 524/442; 264/239
[58] Field of Search .................. 524/442; 264/239

[56] References Cited

U.S. PATENT DOCUMENTS 4,923,665  5/1990  Andersen et al. .................. 264/259

Primary Examiner—John Kight, III
Assistant Examiner—T. Mosley
Attorney, Agent, or Firm—Cushman, Darby & Cushman

[57] ABSTRACT

A workable high-strength heat insulating material containing no asbestos is provided. The high-strength heat insulating material includes fibers of aromatic polyether amide dispersed in the form of filaments, 1-5% by weight, and fibrous wollastonite, 20-70% by weight. The material has a matrix made of a calcium silicate hydrate, and has a density between 1.3-1.9 g/cm$^3$.

5 Claims, No Drawings

HIGH-STRENGTH HEAT INSULATING MATERIAL AND METHOD OF PRODUCING SUCH MATERIAL

BACKGROUND OF THE INVENTION

1. Field of the Invention

The present invention relates to a high-strength heat insulating material containing no asbestos and to a method of producing such a heat insulating material.

2. Description of the Art

An electrically insulating cement plate (commonly called hemit or lumber) defined in Japanese Industrial Standard (JIS) C2210 is formed by molding asbestos using Portland cement as a binder. Since the hemit is easily cut and has an excellent heat-resistant property and high mechanical strength with good machining characteristics such as surface cutting property, boring property and the like, it is used not only as an electrical insulator but also as a heat insulator. For example, the material may be used to fabricate a heat insulating plate for a heated press, a casing for an induction furnace, or the like, which must be cut before use and must be of high strength.

However, since the above JIS standardized goods contain 40% asbestos, a large quantity of harmful asbestos fiber dust is produced. Therefore, there is a need to provide a non-asbestos material having similar strength and workability properties to the asbestos-containing material.

Conventionally, a heat insulating material having a density of 1.6–2.0 $g/cm^3$ obtained by binding talc powder and pulp using Portland cement (Japanese Patent Unexamined Publication No. Sho-61-109205) has been proposed as a cement-quality substitute containing no asbestos. However, the proposed material, has a disadvantage in that its mechanical strength and size are significantly reduced due to heating, because the only reinforcing fiber is pulp. Further, its toughness is insufficient. When the material is heated under application of a large load or under a constrained condition, The material is apt to crack. Therefore, the material has not gained acceptance as a substitute for hemit or the like, even though the material does not contain any asbestos.

SUMMARY OF THE INVENTION

It is an object of the present invention to provide an asbestos-free heat insulating material having a machinable property equivalent to that of hemit or lumber, having superior properties such as heat-resistivity, high strength, and a having suitable electric characteristic.

The present invention provides a workable, high-strength heat insulating material containing fibers of aromatic polyether amide, dispersed in the form of filaments by 1–5% by weight, and fibrous wollastonite by 20–70% by weight. The heat insulating material has a matrix made of a calcium silicate hydrate, and has a density between 1.3–1.9 $g/cm^3$.

The present invention also provides a method of producing the material. The method includes the steps of dispersing fibers of aromatic polyether amide into water containing a fiber disperser; adding Portland cement and fine silicate-quality powder as a mineral binder and fibrous wollastonite as a non-reactive filler to the obtained dispersion liquid; kneading the mixture; dehydration-press molding the kneaded mixture under a condition so that a molding having a density of 1.3–1.9 $g/cm^3$ can be obtained; and finally, curing the molding in an autoclave.

DETAILED DESCRIPTION OF THE PRESENTLY PREFERRED EXEMPLARY EMBODIMENT

In the heat insulating material provided in accordance with the principles of the present invention, aromatic polyether amide fibers exhibit a large reinforcing effect even when the content thereof is small, so that high toughness is provided to the heat insulating material. It is preferable to select the fiber content to be between 0.5–5.0% by weight. If the content is less than 0.5% by weight, the strength of the heat insulating material is insufficient for various uses. If the content is larger than 5.0% by weight, it then becomes difficult to uniformly disperse the fibers in the producing process, and as a result, fiber lumps remain which reduce the machining property of the material. In the embodiment, it is preferable to select the length of the fiber to be 3–12 mm. The reinforcing effect is not satisfactory if the length is shorter than 3 mm, also, the dispersing property in the producing process becomes poor if the length exceeds 12 mm so that the same undesirable result as in the foregoing, excessive composition, is caused.

Fibrous wollastonite performs an important part in the machining property of the heat insulating material according to the present invention. That is, the composition of the fibrous wollastonite can facilitate cutting of the heat insulating material, even though the heat insulating material is a high-density molding. Further, aromatic polyether amide fibers are difficult to cut because of their large toughness and if they are used for reinforcing a cement-quality molding or a calcium silicate-quality molding, fluffs are apt to be generated in a cut-finished surface, although the reinforcement effect is large. In the heat insulating material containing a large quantity of fibrous wollastonite as provided in accordance with the principles of the present invention, however, no fiber fluffs are generated which provides a beautiful, worked surface. The reason that the material of the present invention provides a fluff free product after cutting, is because, in the heat insulating material, solid fibrous wollastonite particles existing near aromatic polyether amide fibers catch the aromatic polyether amide fibers running away from the edge end of a machining tool so as to assist in cutting of the edge end.

The fibrous wollastonite is also useful in reducing the heat shrinkage rate of the heat insulating material and in improving the flexural strength of the same.

The foregoing action is not sufficiently performed if the content of the fibrous wollastonite is made to be less than 20% by weight. However, it is not preferable to make the content thereof to be greater than 70% by weight, because strength is reduced.

In the embodiment, is preferable to select the density of the material to be between 1.3–1.9 $g/cm^3$ so as to obtain sufficient strength while assuring the machining property. That is, although a high-density product having density of 1.9 $g/cm^3$ or more has high strength, it is difficult to cut. Further, the heat-resistant property of the product becomes poor.

Next, the method of producing the heat insulating material according to the present invention will be described.

First, water is prepared wherein a fiber disperser such as polyethylene oxide, polyacryl amide, sodium polyacrylide, or the like is dissolved. Then, aromatic polyether amide fibers are added to the water and agitated so as to be dispersed. Aromatic polyether amide fibers are made available in the market from TEIJIN LIMITED (trade name: TECHNORA). TECHNORA can be used as the fiber disperser, and the multi-filament yarns thereof are cut in advance to be approximately 3-12 mm in length. In addition to adding the aromatic polyether amide fibers to the fiber-dispersed liquid, molding assistants such as pulp, a water reducing agent, and the like, may be added as required to the fiber-dispersion liquid before addition of the fibers or simultaneously with the addition of the fibers and dispersed or dissolved in the liquid.

When agitation has been sufficiently performed to obtain a dispersion liquid in which the fibers have been dispersed in the form of filaments, the mineral binder is added to the dispersion liquid. Portland cement and fine silicate-quality powder are preferably used as the binder. Silica powder, silica flour or the like may be used as the fine silicate-quality powder. A particularly fine silicate-quality raw material, for example, silica flour, may be added and dispersed at the time of preparation of the foregoing fiber-dispersed liquid since such a material is difficult to be incorporated into a uniform mixture of the raw material. The fine silicate-quality powder reacts with lime separated from Portland cement to thereby generate calcium silicate in autoclave treatment after molding. The raw material is added by about 30-100% by weight, relative to the Portland cement.

Further, fibrous wollastonite is added to the liquid simultaneously with the addition of the mineral binder or after the addition thereof, and sufficiently mixed. The fiber disperser such as polyethylene oxide, polyacryl amide, sodium polyacrylide, or the like, is changed in quality by alkali in the cement in the mixing process so that it loses stringiness, viscosity, and water holding property, while it exhibits a powder cohesion action to enhance dehydration molding. It is therefore preferable to use the foregoing materials as the fiber disperser for use in the producing method according to the present invention.

The uniform mortar which has been obtained as described above is subject to dehydration press molding. At this time, the molding condition is adjusted so that a final product has density of 1.3-1.9 g/cm$^3$.

The obtained molding is pre-cured at an ordinary temperature in accordance with a generally-used method, and shifted into an autoclave so as to be cured under a heated and pressured state at about 150-179 degrees Celsius for approximately 7-10 hours. Although generated calcium silicate is almost in a so-called C-S-H stage in the treatment condition, it is necessary to carefully perform the treatment under a treatment condition which does not become harder than the foregoing autoclave curing condition, so that the aromatic polyether amide fibers can be prevented from deteriorating.

The treated molding is used after it has been subjected to working, for example, such as cutting, boring, surface grinding, etc., in accordance with a requirement.

EXAMPLES

Fibrous wollastonite (standard A60) used in the following examples and comparison examples was made in India. The mean diameters and mean lengths of fibrous particles were 16 μm and 150 μm respectively. As the aromatic polyether amide fibers, used was TECHNORA T320 (produced by TEIJIN Ltd.; the filament diameter being 12 μm; multifilament yarn of 1000 filaments of 1500 denier) which was cut so as to be 6 mm in length. Portland cement, silica powder, and silica flour were mixed with each other with the weight ratio of 60:20:20 to form the mineral binder. KAO MIGHTY (KAO Corporation) was used as the water reducing agent. Polyethylene oxide, used as the fiber disperser, was ALCOXE E160 (MEISEI CHEMICAL WORKS Ltd.)

The product test method was as follows:

1. Flexural strength and toughness: A test piece (60 mm × 120 mm × 10 mm) heated at 105 or 200 degrees Celsius for 24 hours was subjected to three-point bending test with a span of 100 mm. Toughness was expressed by a value obtained by dividing an area (the quantity of work) of a quantity of flexure up to 2 mm in the stress-flexure curve in the bending test, by the sectional area of the test piece.

2. Heat shrinkage rate: The shrinkage rate of the above bending test piece when it was heated at 200 degrees Celsius for 24 hours was measured.

3. Smoothness of cut surface: The surface of a product was milling-cut with a miller, and existence of fluffs of aromatic polyether amide fibers and pill due to not-solved fiber flux generated in the cut surface was measured. Categories of smoothness for comparison are as follows:

A: uniform and smooth surface having no fluffs and no pill;
B: smooth surface having a few fluffs;
C: partially uneven surface having insufficiently dispersed fiber flux and fluffs;
D: uneven surface due to almost non-dispersed fiber flux and pill.

4. Boring test: Boring work was performed with a drill having a diameter of 10 mm, a rotation speed was 260 rpm, and a feed speed of 40 mm/min without using a lower plate, and the size of a notch generated in a sample by punching of the drill was measured.

5. Cutting test: A sample was dry cut by using a diamond segment saw (external size, 356 mm; edge thickness, 3 mm) with the rotation speed of 180 rpm and the feed speed of 2000 mm/min, and the size of a notch in the cut end of the sample was measured.

EXAMPLE 1

Pulp, silica flour, and the water reducing agent were mixed with each other in water and the thus obtained mixed liquid was taken into an omnimixer by a predetermined quantity. Then, polyethylene oxide, the fiber disperser, was added to the mixed liquid and further agitated. Thereafter, aromatic polyether amide fibers were added to the mixture liquid and sufficiently agitated so as to be in the state of filaments. Fibrous wollastonite, Portland cement, silica powder, and the water reducing agent were added to the liquid and agitated so as to prepare uniform mortar.

The obtained mortar was subjected to dehydration press molding to prepare a plate of 120 mm × 150 mm × 15 mm under a condition for obtaining a final product having density of 1.6 g/cm$^3$, procured at an ordinary temperature for 12 hours, and cured in an autoclave at 179 degrees Celsius for 10 hours.

In the foregoing producing method, three kinds of heat insulating materials were produced under the condition that no fibrous wollastonite was used or the quantity of composition there of was changed. Table 1 shows the raw material composition and product characteristic of each of the examples.

TABLE 1

| | Example Comparison | | |
|---|---|---|---|
| | Ratio (Weight portion) | | |
| | Comparison | EX. 1 | EX. 2 |
| Raw Material Composition: | | | |
| fibrous wollastonite | 0 | 45 | 75 |
| aromatic polyether amide fiber | 2 | 2 | 2 |
| mineral binder | 95 | 50 | 20 |
| pulp | 1 | 1 | 1 |
| water reducing agent | 0.1 | 0.1 | 0.1 |
| polyethylene oxide | 0.2 | 0.2 | 0.2 |
| water | 100 | 140 | 180 |
| Product Characteristic | | | |
| Flexural strength (kgf cm$^2$) | | | |
| 105 deg. Celsius | 180 | 310 | 150 |
| 200 deg. Celsius | 150 | 300 | 120 |
| Toughness (kgf/cm) | | | |
| 105 deg. Celsius | 2.0 | 2.4 | 1.9 |
| 200 deg. Celsius | 1.8 | 2.3 | 1.6 |
| Heat shrinkage rate (%) | 0.21 | 0.06 | 0.04 |
| Smoothness of cut surface | C | A | B |
| Boring test (mm) | 2.5 | 0.5 | 0.5 |
| Cutting test (mm) | 2.0 | 0.5 | 0.5 |

EXAMPLE 2

Three kinds of heat insulating material were produced in the same process as in the case of Example 1 under the condition that the composition ratio of fibrous wollastonite and of the mineral binder were fixed, while the composition ratio of aromatic polyether amide fibers was changed.

Table 2 shows the raw material composition and product characteristic of each of the examples.

TABLE 2

| | Example Comparison | | |
|---|---|---|---|
| | Ratio (Weight portion) | | |
| | Comparison | EX. 1 | EX. 2 |
| Raw Material Composition: | | | |
| fibrous wollastonite | 40 | 40 | 40 |
| aromatic polyether amide fiber | 0 | 2 | 6 |
| mineral binder | 45 | 45 | 45 |
| talc | 10 | 10 | 10 |
| pulp | 3 | 1 | 1 |
| water reducing agent | 0.1 | 0.1 | 0.1 |
| polyethylene oxide | 0.2 | 0.2 | 0.2 |
| water | 140 | 140 | 180 |
| Product Characteristic | | | |
| Flexural strength (kgf/cm$^2$) | | | |
| 105 deg. Celsius | 280 | 310 | 250 |
| 200 deg. Celsius | 220 | 300 | 240 |
| Toughness (kgf/cm) | | | |
| 105 deg. Celsius | 0.9 | 2.4 | 3.9 |
| 200 deg. Celsius | 0.6 | 2.3 | 3.6 |
| Heat shrinkage rate (%) | 0.07 | 0.06 | 0.04 |
| Smoothness of cut surface | A | A | D |
| Boring test (mm) | 0.5 | 0.5 | 1.5 |
| Cutting test (mm) | 0.5 | 0.5 | 2.0 |

EXAMPLE 3

Three kinds of heat insulating materials were produced by the raw material composition of Table 3 in the same process as in the case of Example 1.

Table 3 also shows the characteristic of the obtained heat insulating materials.

TABLE 3

| | Example Comparison | | |
|---|---|---|---|
| | Ratio (Weight portion) | | |
| | Comparison | EX. 1 | EX. 2 |
| Raw Material Composition: | | | |
| fibrous wollastonite | 45 | 45 | 45 |
| aromatic polyether amide fiber | 2 | 2 | 2 |
| mineral binder | 50 | 50 | 50 |
| pulp | 1 | 1 | 1 |
| water reducing agent | 0.1 | 0.1 | 0.1 |
| sodium polyacrylide | 0.2 | 0 | 0 |
| polyethylene oxide | 0 | 0.1 | 0 |
| polyacrylamide | 0 | 0 | 0.2 |
| water | 140 | 140 | 140 |
| Product Characteristic | | | |
| Flexural strength (kgf/cm$^2$) | | | |
| 105 deg. Celsius | 300 | 330 | 320 |
| 200 deg. Celsius | 280 | 300 | 300 |
| Toughness (kgf/cm) | | | |
| 105 deg. Celsius | 2.4 | 2.5 | 2.6 |
| 200 deg. Celsius | 2.2 | 2.4 | 2.4 |
| Heat shrinkage rate (%) | 0.07 | 0.06 | 0.07 |
| Smoothness of cut surface | B | A | B |
| Boring test (mm) | 0.5 | 0.5 | 0.5 |
| Cutting test (mm) | 0.5 | 0.5 | 0.5 |

As described above, the heat insulating material according to the present invention has improved strength and toughness owing to the synergistic effect between aromatic polyether amide fibers dispersed in the form of filaments and fibrous wollastonite, even though the heat insulating material does not contain any asbestos. The heat-resistant property and machining property are superior. Therefore, the heat insulating material according to the present invention can be broadly used as a substitute for an asbestos cement plate, that is, hemit, to be used as an electrically insulating plate, a heat insulating material, or the like.

What is claimed is:

1. A high-strength heat insulating material comprising:
    fibers of aromatic polyether amide dispersed in water in the form of filaments having a content of approximately 1–5% by weight;
    fibrous wollastonite having a content between 20–70% by weight; and
    a matrix made of a calcium silicate hydrate, said heat insulating material having a density between 1.3–1.9 g/cm$^3$.

2. A high-strength heat insulating material comprising:
    fibers of aromatic polyether amide dispersed in water in the form of filaments having a content of at least 1% by weight;
    fibrous wollastonite having a content of at least 20% by weight; and
    a mineral binder including a mixture of Portland cement, silica powder, and silica flour having a weight ratio of 60:20:20 respectively, said heat insulating material having a density between 1.3–1.9 g/cm$^3$.

3. A heat insulating material as claimed in claim 2, further including approximately 1% by weight of pulp and 0.1% by weight of water reducing agent.

4. A method of producing a heat insulating material comprising the steps of:

dispersing fibers of aromatic polyether amide into water containing a fiber disperser to obtain a dispersion liquid;

adding Portland cement and fine silicate-quality powder as a mineral binder and adding fibrous wollastonite as a non-reactive filler to the dispersion liquid;

kneading the mineral binder and filler mixture;

dehydration-press molding the kneaded mixture under a condition so that a molding having a density between of 1.3–1.9 g/cm$^3$ is obtained; and curing the molding in an autoclave.

5. The method according to claim 4, wherein one of polyethylene oxide, polyacryl amide and sodium polyacrylate is used as said fiber disperser.

* * * * *